ACOUSTIC AND ELECTRONIC STETHOSCOPE

Filed June 26, 1964 4 Sheets-Sheet 1

INVENTORS
RALPH CEFALY
RONALD E. IRONS

BY Beale and Jones
ATTORNEYS

INVENTORS
RALPH CEFALY
RONALD E. IRONS
BY Beale and Jones
ATTORNEYS

INVENTORS
RALPH CEFALY
RONALD E. IRONS
BY Beale and Jones
ATTORNEYS

ACOUSTIC AND ELECTRONIC STETHOSCOPE

INVENTORS
RALPH CEFALY
RONALD E. IRONS

BY Beale and Jones
ATTORNEYS

United States Patent Office 3,247,324

Patented Apr. 19, 1966

3,247,324

ACOUSTIC AND ELECTRONIC STETHOSCOPE

Ralph Cefaly, 305 Perry St., Brentwood, Md., and Ronald E. Irons, Burke, Va.; said Irons assignor to said Cefaly Filed June 26, 1964, Ser. No. 378,249
15 Claims. (Cl. 179—1)

This invention relates to improvements in stethoscopes and particularly to improvements in the selective range and efficiency of a stethoscope.

This application is a continuation-in-part of our co-pending application Serial Number 224,755, filed September 19, 1962, and now abandoned.

It is an object of the invention to provide a stethoscope that combines the advantages of acoustical listening with selective amplification of desired frequencies without interference from other frequencies and the distortions due to amplification of other frequencies.

Another object of the invention is to provide in a combination bell-type stethoscope and electronically amplifying stethoscope, a sound pick-up column of air from sound pick-up head that is common to both the bell-type system and the electronically amplifying system.

Yet another object of the invention is to provide a light-weight, efficient stethoscope combining the features of an acoustic stethoscope with an amplifier for a selective range of frequencies.

A further object of the invention is to provide a self-contained, light-weight stethoscope that has selective amplification to make more effective the diagnostic acuity of users having defective hearing.

A still further object of the invention is to provide a stethoscope that has the facility of ease of use and that will selectively amplify fetal heart sounds.

Yet a further object of the invention is to provide a light-weight, self-contained stethoscope that selectively increases the clarity of low amplitude sounds in the range of about 40 c.p.s. to about 300 c.p.s.

A further object of the invention is to provide an amplifying stethoscope that is useful in elimination of masking due to obesity of the patient on which the stethoscope is being used.

A still further abject of the invention is to provide an amplifier network in a stethoscope in which the amplifier response is equalized by de-emphasis of frequencies from about 50 c.p.s. to about 600 c.p.s. where a minimum occurs.

Another object of the invention is to provide a composite stethoscope that automatically cuts off the regular aural stethoscope when an amplifier is imposed in the stethoscope whereby beneficial effects of amplification are obtained without feed back through passages of the aural stethoscope.

Still further objects and the entire scope of applicability of the present invention will become apparent from the detailed description given hereinafter. It should be understood, however, that the detailed description and specific example is given by way of illustration only and, while indicating a preferred embodiment of the invention, is not given by way of limitation, since various changes and modifications within the spirit and scope of the invention will become apparent to those skilled in the art from this detailed description.

For a more complete understanding of the nature and scope of the invention, reference is had to the drawings in which, FIG. 1 is a front elevational view of the composite stethoscope;

Throughout the specification like reference numbers and characters refer to similar parts.

Figures 1, 2, 3, 4, 5:
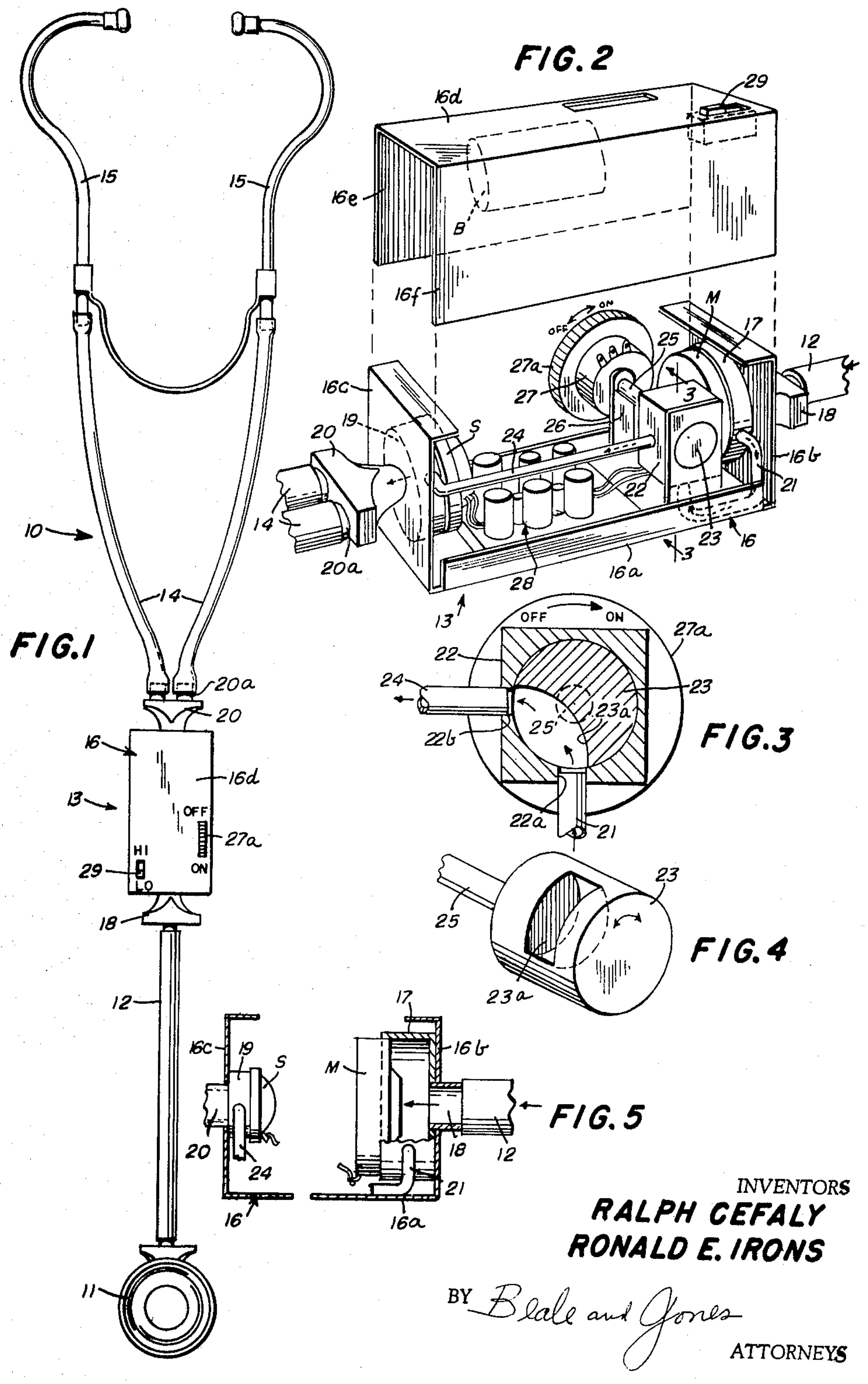
FIG. 2 is an exploded view on an enlarged scale of the aural passage, valve and amplifier showing the common control.
FIG. 3 is an enlarged sectional view of the aural passage valve along line 3—3 of FIG. 2.
FIG. 4 is a perspective view of the central movable body of the valve of FIG. 3 with integral operating stem broken away.
FIG. 5 is a fragmentary sectional side view of FIG. 2 showing the acoustical chambers and associated speaker and microphone.

A composite stethoscope according to this invention is generally indicated at 10 in FIG. 1 and includes a pick-up head 11, a flexible conduit 12 connecting the head with a coupler unit generally indicated at 13, a pair of flexible conduits leading from unit 13 to a typical binaural headpiece generally indicated at 15—15.

The coupler unit 13 is here illustrated as comprising an elongated housing 16 having a base **16*a*, turned up ends 16*b* and 16*c* and a cooperating detachable cover member 16*d* with depending sides 16*e* and 16*f*. This housing 16 is made of suitable light-weight aluminum sheet material but might be a molded plastic housing or otherwise. Attached to the inside of end 16*b* is a first acoustical chamber 17 having a tubular fitting 18 leading through an aperture in the end 16*b* and to which the flexible conduit 12 is attached to conduct sounds to the chamber 17. At the other end 16*c* is attached on the inside, in a similar manner, a second acoustical chamber 19 having connected therewith a tubular fitting 20 which leads through an aperture in the end 16*c* to the outside and has bifurcated tubes 20*a*, see FIG. 1, to which the pair of flexible conduits 14—14** are attached.

Interconnecting the acoustical chambers 17 and 19 is the aural system comprising a rigid conduit 21 leading from chamber 17 to a valve housing 22 and a rigid conduit 24 leading from the valve housing 22 to the chamber 19. Within the valve housing 22 is a rotary plug type valve 23 having a slotted cutaway portion **23*a* therein which extends for a 90° arc that connects an aperture 22*a* in the housing 22 with an aperture 22*b* in a second face of the housing disposed 90° to a first face. The rigid conduit 24 connects the valve housing 22 at aperture 23*c* with the second acoustical chamber 19. It is to be noted that a slight turn of the rotary valve 23** will cause a cutoff of the interconnected acoustical chambers and thus cut off the aural system and actuate the amplifier network.

The rotary valve has attached to one end thereof an operating shaft 25 that is supported by a bracket 26 upstanding from the bottom 16*a* of the housing. On the end of shaft 25 is a rotary on-and-off switch 27 having a knurled knob 27*a* that projects up through a suitably arranged slot in cover 16*d*. The battery B is connected by suitable connection (not shown in FIG. 2) to a terminal of switch 27 and to the ground. The leads for connecting the battery B are shown in the circuit diagram in FIG. 6. This switch 27 thus turns on and off the supply to the amplifier circuit from battery B, shown in FIGS. 2 and 6, the amplifier circuit serving as a selective but cooperative listening system and also the switch 27 operates the valve 23 that cuts on and off the aural system. Thus the switch mechanism and its connections to valve 23 serves to change the stethoscope from a so-called bell-type stethoscope to an electronic stethoscope. It has been found that this cooperation of the valve and switch cuts detrimental feed back in the electronic system.

The housing cover 16*d* serves as a mounting for the battery B to power the transistorized pickup and amplifying system as well as a high and low frequency range selective switch to be described.

In FIG. 5 there is shown at the right hand the mounting of the miniature microphone M on the inner face of the first acoustical chamber 17 for picking up sound therefrom. On the left hand of FIG. 5 there is illustrated the mounting of the speaker or reproducer S on the inside face of the second acoustical chamber 19.

Figure 6:
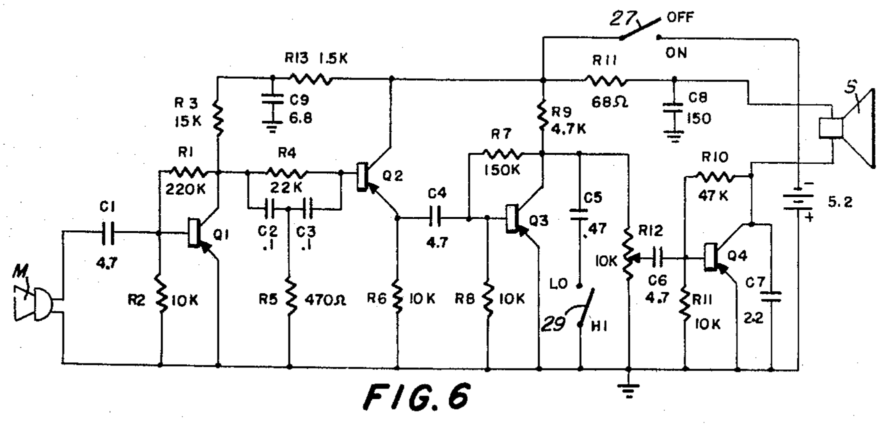
FIG. 6 is a circuit diagram of the amplifier.

In FIG. 6 there is shown the circuit for the pickup and amplifier generally indicated at 28 in FIG. 2. This stethoscope amplifier or preamplifier is of the transistorized type and is shown with a four-stage amplifier being used with three common emitter stages and one common collector stage. A bridge T network consisting of F4, R5, C2 and C3 is connected between Q1 and Q2. This network equalizes the amplifier response by de-emphasizing frequencies from 50 cycles per second to about 600 c.p.s. where a minimum occurs. Equalization is necessary to compensate for the microphone and speaker impedance which have poor low frequency response and together produce a large peak at 600 c.p.s. By reference to FIG. 8 it will be observed that without this circuit the overall response of an aural stethoscope is poor at low frequencies and badly peaked at 600 c.p.s. Capacitor C7 serves to further attenuate frequencies above 100 c.p.s. which are not important for this application.

Figure 8:
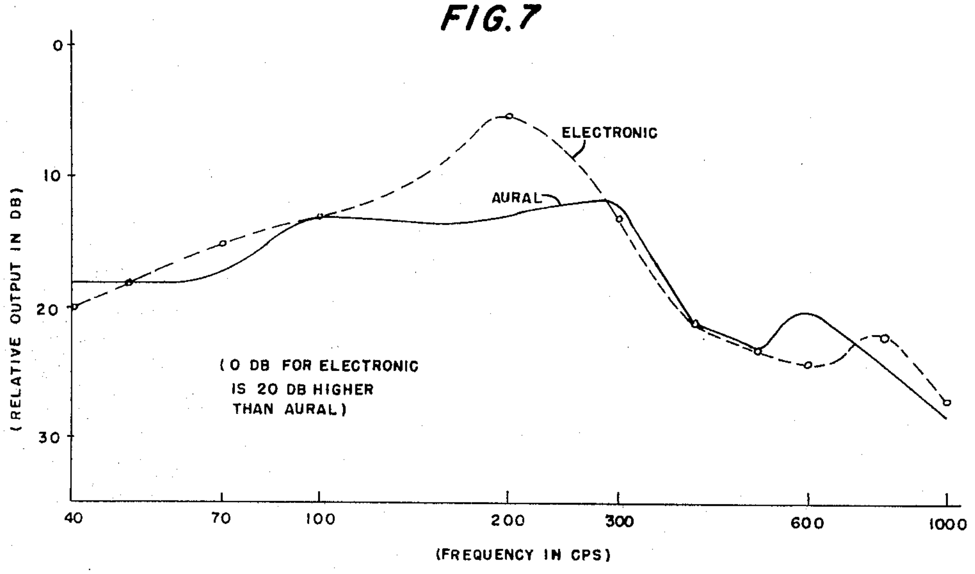
FIG. 8 is a graphic comparison of aural and electronic stethoscopes according to the invention.

An overall response curve of the compensated electronic stethoscope is shown in FIG. 8 along with a curve of the aural operating mode of the aural component of the stethoscope. A capacitor C5 is used to further attenuate high frequencies (above 300 c.p.s.) when the user desires to concentrate on low frequency sounds. This capacitor is switched in and out by a switch 29 carried in the cover 16*d*.

Figure 7:
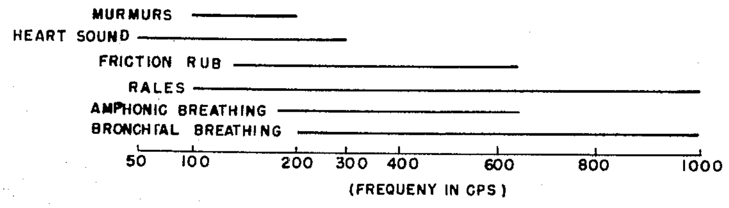
FIG. 7 is a graphic illustration of sound ranges for various studied sounds.

Reference to FIG. 7 shows a chart of the frequency ranges of interest to the doctor and user of stethoscopes. These may be summarized as follows:

| | C.p.s. |
|---|---|
| Main portion of heart sounds and murmurs | 7–300 |
| Lowest murmur frequency in one series | 50 |
| Murmur range—very rare, occasional ascending to 1000 c.p.s. | 120–160 |
| Precardial friction rub | 140–660 |
| Rales | 120–1000 |
| Amphonic breathing | 240–660 |
| Bronchial breathing | 240–1000 |
| Murmur range | 100–200 |

Note in FIG. 8 that this electronic stethoscope performance amplifies particularly in the 100 to 300 c.p.s. range within which fall murmurs and heart sounds as shown in FIG. 7 which are of prime importance for proper diagnostic purposes. Having available in a composite light-weight, easily usable stethoscope that has the advantages of the aural stethoscope with the selective frequency amplification by the particularly arranged electronic circuit easily shifted from electronic to aural and vice versa with cut off of feed back in electronic use is a marked advance in the stethoscope art.

While the arrangement of the coupler as so-called at 13 is of relatively small size, this is illustrative as here depicted. The aural cut on-and-off valve 22–23 is representative and may be modified. It is to be noted that in the coupler portion 13 there is easily manipulatable by the doctor or user the on-off switch 27 and the rheostat R12 cooperating therewith.

Figure 9:
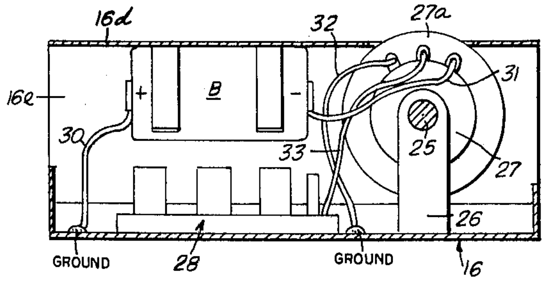
FIG. 9 is a side elevation of the apparatus in the lower portion of FIG. 2 with certain electrical leads shown following the circuit diagram in FIG. 6.

In FIG. 9 which is the same coupler unit 13 as in FIGS. 1 and 2, the battery B has its positive terminal connected to a ground lead 30 grounded to the case 16. Another lead 31 connects the negative terminal of battery B to one of three terminals on switch unit 27. Another terminal on switch unit 27 is connected to ground on case 16 by lead 32. The third terminal on switch unit 27 has a lead 33 to the amplifier unit.

Figure 10:
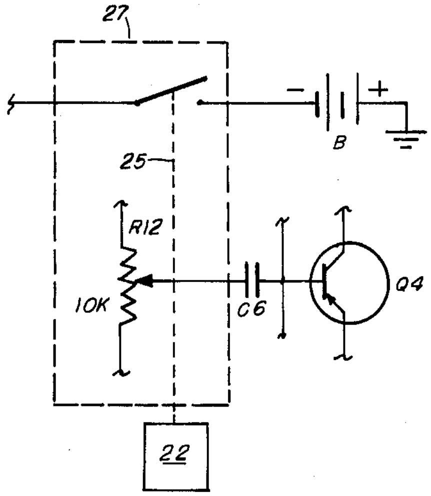
FIG. 10 is a fragmentary circuit diagram showing the combined on-off switch and volume control potentiometer and mechanical connection controlling the acoustical valve.
Figure 14:
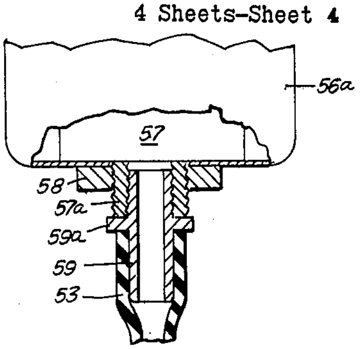
FIG. 14 is a general sectional view along line 14—14 of FIG. 11 on an enlarged scale with a portion of the cover broken away.

In FIG. 10 the switch unit 27 is shown with the rotary control rod 25 leading from the knurled knob 27*a*, see FIG. 2, to operate the acoustical valve 22 and the volume control potentiometer R12.

The modification shown in FIGS. 11–16 is another configuration that the composite stethoscope may take. This stethoscope is generally indicated at 50 and comprises a coupler unit 51, a sound pick up head 52 having a coupling air column tube 53 connecting it to the coupler unit 51. The coupler unit 51 is connected to a binaural listening set generally indicated at 55 and has a coupling air tube 54 connecting it to the output of the coupler unit 51.

The coupler unit 51 has a two part cylindrical housing 56 with a bottom portion 56*a* and a top portion 56*b*. Within the housing is mounted the acoustical tubing, valve for same, sound pick-up air chamber and microphone, amplifier unit and controls and sound output chamber and output speaker all as will be described. This unit 13 is very compact yet it may be easily taken apart to replace the battery and the replaceable electronic module portion.

A sound pick-up chamber is generally indicated at 57 and it has an internally and externally threaded nipple 57*a* which receives thereover the bottom end 56*a* of the housing having a suitable end aperture therethrough. A knurled nut 58 is threadedly received on the nipple 57 and holds the bottom end 56*a* in place. A tubular fitting 59 externally threaded on one end and having an annular flange 59*a* intermediate its ends is threadedly received in the internally threaded nipple 57*a*. The outer end of fitting 59 receives thereon the upper end of flexible coupling tube 53.

Attached to the pick-up sound chambers 57 is a miniature microphone M. Supporting the second chamber 17 and microphone M is a plate or mounting platform 60 which extends for about one-third the length of housing 56. A pair of spacers 61 at the inner end corners of plate 60 supports the adjacent end of a second plate or platform 62 which is secured to the spacers by screws 62*a*. The other end of the plate 62 is affixed to the top end portion 56*b* of the housing 56.

A sound output chamber 63 has a nipple 63*a* affixed thereto that projects through an aperture in the end of top portion 56*a* of the housing. The nipple 63 is internally and externally threaded like nipple 57*a* and receives thereover a nut 64. Another tubular-like fitting 59 at the other end is received in nipple 63 and has connected thereto the tubing 54 leading to the binaurals 55.

Figure 15:
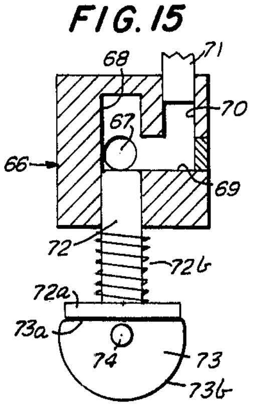
FIG. 15 is a sectional view of the acoustical passage valve and its operator member along line 15—15 of FIG. 13 on an enlarged scale showing the valve open.
Figure 16:
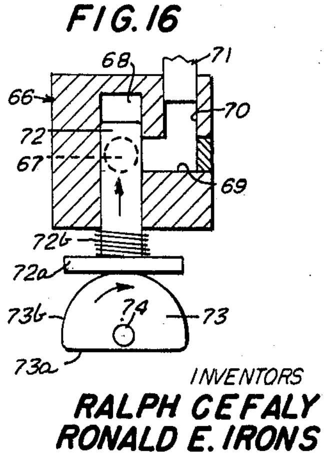
FIG. 16 is a view similar to FIG. 15 showing the acoustical passage valve closed.

The acoustical system through the coupler unit 51 comprises a rigid tube 65 leading from sound pick-up chamber 57 to passage 67 in a valve block generally indicated at 66 and mounted on plate 62. In this block 66, passage 67 connects with a transverse passage 68, see FIGS. 15 and 16. Passage 68 leads to an outside face of block 66. Intermediate the ends of passage 68 is a transverse passage 69 connecting with another passage 70, generally parallel to passage 68 and leading to the top and outside face of valve block 66. From the passage 70 there extends a rigid sound output conduit 71 that connects with output chamber 63. A reciprocating plunger valve element 72 is received in the passage 68 and, as shown in FIGS. 15 and 16, has an outer transverse head 72*a* that rides against and is actuated by an actuator disc 73. The actuator disc 73 has a flat portion 73*a* and a partial circular portion 73*b*.

Actuator disc 73 is mounted on a shaft 74 leading to a center shaft of a combined on and off switch and potentiometer generally indicated at 75. Switch 75 has a knurled actuator knob 75*a*. The knurled knob 75*a* projects out through a suitable slot 56*c* in housing portion 56*b*. This combination on and off switch and potentiometer is like the switch 27 operating the potentiometer R12 therein and valve 22 in the first described stethoscope and serves the same purposes.

In FIG. 16 the actuator 73 has its circular portion 73*b* riding against 72*a* to move the valve plunger 72 in against spring 72*b* to close off the connection between aural passage 67 and aural passage 69. In FIG. 16 the flat portion 73*a* of actuator 73 is moved to be against 72*a* and the plunger is withdrawn so that aural passage 67 is in communcation with aural passage 69.

A Hi-Lo switch 76 which is the same as switch 29 previously described and shown in the circuit diagram in FIG. 6 is used to place in circuit capacitor C5 to further attenuate high frequencies (above 300 c.p.s.) when the user desires to concentrate on low frequency sounds. When the switch operator 76*a* that projects through a slot in the housing is moved to Lo, the capacitor C5 is placed in circuit.

A power supply battery B is mounted in suitable spaced apart spring clips 77 attached to mounting plate 60.

The minature speaker or receiver S is mounted on the output sound chamber 63 so that sounds reproduced travel directly to sound chamber 63 and thence to the binuarals.

Figures 12, 13:
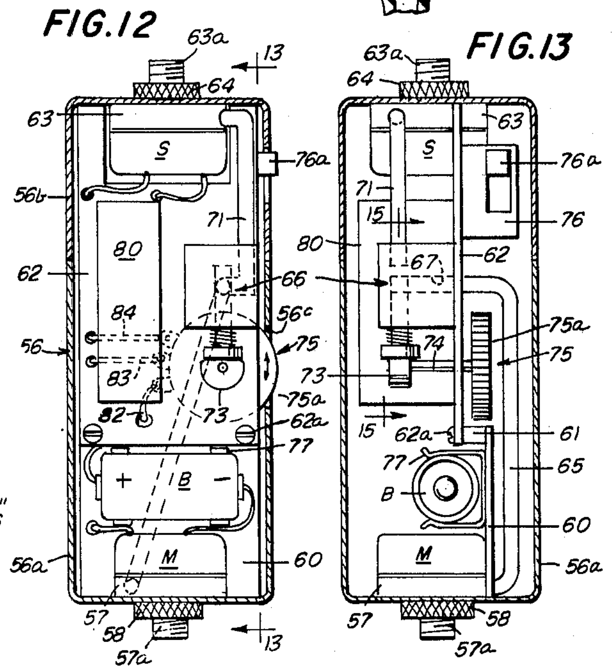
FIG. 12 is a general sectional view along line 12—12 of FIG. 11 on an enlarged scale.
FIG. 13 is a sectional view along line 13—13 of FIG. 12.

Removably mounted on the plate 62 is an electronic module base for receiving a cooperating removable module portion 80 which contains circuit components plugged into circuit connections in the base. In FIG. 12, lead 82 goes to ground, lead 83 to the volume control potentiometer R12 and lead 84 to the amplifier unit, output of stage 3.

Figure 11:
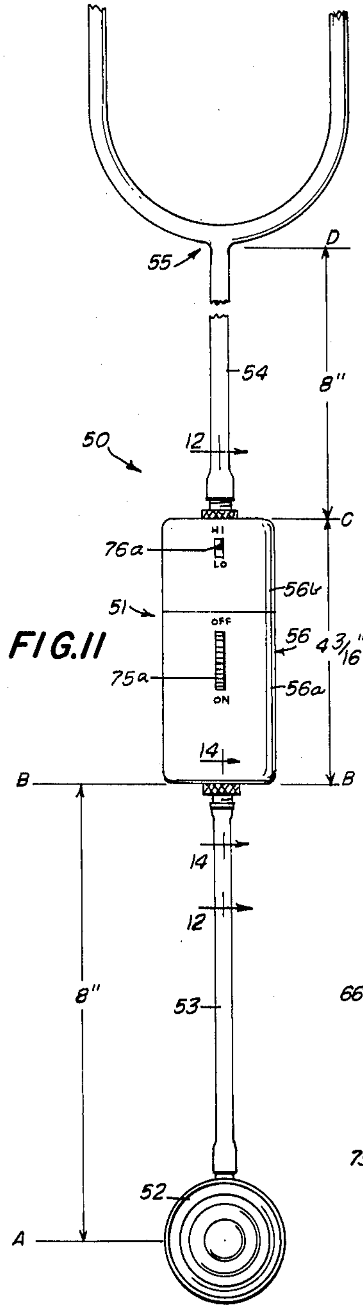
FIG. 11 is a modified form of the stethoscope with the binaural head piece fragmentarily shown.

In FIG. 11 it will be noted that certain relative lengths have been indicated. The length AB from the center of the pick-up head 52 of the air column tube 53 to the entrance of the sound chamber 57 is about 8 inches. This also is the same length as for the corresponding parts of the stethoscope in FIG. 1. The length BC of the coupler unit 51 is 4$\frac{3}{16}$ inches and the length CD of the coupling air tube 54 to the bifurcation of the binaurals is also about 8 inches. The diameter of the coupler unit 51 is 1$\frac{5}{8}$ inches. It is within the scope of the invention that the coupler unit could be turned end for end with replacement of the microphone M in the then bottom end and the speaker S in the then top end with corresponding adjustment in the wiring leads.

The flexible tubular members 53 and 54 have an internal bore diameter of about $\frac{1}{8}$ inch. It has been found that the air column length AB on the acoustical pick-up air column gives best results with about the 8 inch length. A one inch increase of the length of the air column AB gives a reduction of $\frac{1}{6}$ decibel. Thus, the optimum has been found for the length of the air column AB from pick-up head to the sound chamber 57.

These stethoscopes have had high acceptance by their users. They are a marked advance in light-weight and efficient stethoscopes and have provided the doctor and user with stethoscopes that have increased the range and effectiveneness of diagnosis.

What is claimed is:

1. A stethoscope comprising in combination, an acoustical sound pick-up head means, a first acoustical chamber, an elongated conduit means having an air column of appreciable length as compared with its cross-sectional area connecting said sound pick-up head means and said first acoustical chamber, a second acoustical chamber, sound duct and valve means interconnecting the two acoustical chambers, said valve means in one position interrupting the sound communication between the first and second chambers, a microphone in said first acoustical chamber, a sound reproducer in said second acoustical chamber, an amplifier network interconnecting the microphone and the sound reproducer, said amplifier means having a control means, means connecting the control means and said valve means whereby when said amplifier is activated said valve means interrupts the sound communication between the first and second chambers, earpiece means connected with said second acoustical chamber for receiving sound therefrom.

2. A stethoscope according to claim 1 wherein said amplifier network has means therein to equalize the amplifier response by de-emphasizing frequencies from about 50 c.p.s. to about 600 c.p.s. whereby to compensate for the microphone and sound reproducer impedance.

3. A stethoscope according to claim 2 wherein said amplifier network has selective means for connection therein to attenuate high frequencies above about 300 c.p.s. when the user desires to concentrate on low frequency sounds therebelow.

4. A stethoscope according to claim 1 wherein said amplifier network has means therein to attenuate frequencies above about 1000 c.p.s. which are undesirable.

5. In a stethoscope an acoustical sound pick-up head, a first acoustical chamber, an elongated conduit means having an air column of appreciable length as compared with its cross-sectional area connecting said sound pick-up head and said first acoustical chamber, a microphone connected in said first acoustical chamber, a sound reproducer, an amplifier network interconnecting the microphone and the sound reproducer, said amplifier network having means therein to equalize the amplifier response by de-emphasizing frequencies from about 50 c.p.s. to about 600 c.p.s. whereby to compensate for the microphone and sound reproducer impedance and selective means for connection therein to attenuate high frequencies above about 300 c.p.s. when the user desires to concentrate on low frequency sounds therebelow.

6. In a stethoscope according to claim 5 wherein said amplifier network has means therein to attenuate frequencies above about 1000 c.p.s. which are undesirable.

7. A stethoscope comprising in combination, an acoustical sound pick-up head means, a first acoustical chamber, an elongated conduit means having an air column of approximately 8 inches in length and an internal diameter approximately $\frac{1}{8}$ inch connecting said sound pick-up head means and said first acoustical chamber, a second acoustical chamber, sound duct and valve means interconnecting the two acoustical chambers, said valve means in one position interrupting the sound communication between the first and second chambers, a microphone in direct communication with said first acoustical chamber, a sound reproducer in direct communication with said second acoustical chamber, an amplifier network interconnecting the microphone and the sound reproducer, said amplifier means having a control means, means connecting the control means and said valve means whereby when said amplifier is activated said valve means interrupts the sound communication between the first and second chambers and earpiece means connected with said second acoustical chamber for receiving sound therefrom.

8. A stethoscope according to claim 7 wherein said valve means has a rotary plug with a passage therein that in one position provides communication between the duct means and another position interrupts communication in the duct means, said means connecting the control means and said valve means being connected to said rotary plug to rotate the same.

9. A stethoscope according to claim 7 wherein said valve means has a housing with a first and second passage, a third passage connecting said first and second passages, said sound duct means having a portion connecting said first acoustical chamber and said first passage in the housing and another portion connecting the second passage in the housing and the second acoustical chamber, a reciprocating plunger in one of said passages movable to one position to interrupt sound communication in the interconnected passages and another position to permit communication between the passages, said means connecting the control means and the valve means being connected with the plunger to move same to positions to carry out said interruption and communication between said passages.

10. A stethoscope according to claim 9 wherein spring means are positioned adjacent said plunger urging it to open position of said passages.

11. A stethoscope according to claim 7 wherein said amplifier network has means therein to attenuate frequencies above about 1000 c.p.s. which are undesirable.

12. A stethoscope according to claim 7 wherein said amplifier network has means therein to equalize the amplifier response by de-emphasizing frequencies from about 50 c.p.s. to about 600 c.p.s. whereby to compensate for the microphone and sound reproducer impedance.

13. A stethoscope according to claim 12 wherein said amplifier network has selective means for connection therein to attenuate high frequencies above about 300 c.p.s. when the user desires to concentrate on low frequency sounds therebelow.

14. In a stethoscope an acoustical sound pick-up head, a first acoustical chamber, an elongated conduit means having an air column of approximately 8 inches in length and of an internal diameter of about 1/8 inch connecting said sound pick-up head means and said first acoustical chamber, a microphone connected to the pick-up head, a sound reproducer, an amplifier network interconnecting the microphone and the sound reproducer, said amplifier network having means therein to equalize the amplifier response by de-emphasizing frequencies from about 50 c.p.s. to about 600 c.p.s. whereby to compensate for the microphone and sound reproducer impedance and selective means for connection therein to attenuate high frequencies above about 300 c.p.s. when the user desires to concentrate on low frequency sounds therebelow.

15. A stethoscope according to claim 14 wherein said amplifier network has means therein to attenuate frequencies above about 1000 c.p.s. which are undesirable.

No references cited.

ROBERT H. ROSE, *Primary Examiner.*